United States Patent [19]
Husse

[11] 4,104,915
[45] Aug. 8, 1978

[54] ULTRASONIC DEVICE FOR THE DETERMINATION OF THE RATE OF AIR FLOW IN THE INLET DUCT OF AN INTERNAL COMBUSTION ENGINE

[75] Inventor: Massimo Husse, Turin, Italy
[73] Assignee: FIAT Societa per Azioni, Turin, Italy
[21] Appl. No.: 813,740
[22] Filed: Jul. 7, 1977
[30] Foreign Application Priority Data
  Jul. 9, 1976 [IT] Italy ................. 68718 A/76
[51] Int. Cl.² ........................... G01F 1/66
[52] U.S. Cl. ........................... 73/194 A; 73/118
[58] Field of Search ............... 73/116, 118, 194 A

[56] References Cited
U.S. PATENT DOCUMENTS

| 3,956,928 | 5/1976 | Barrera | 73/116 |
| 3,964,309 | 6/1976 | Husse et al. | 73/194 A |
| 4,014,210 | 3/1977 | Husse et al. | 73/194 A |

*Primary Examiner*—Charles A. Ruehl
*Attorney, Agent, or Firm*—Sughrue, Rothwell, Mion, Zinn and Macpeak

[57] ABSTRACT

A device for determining the rate of flow of air in the intake duct of an internal combustion engine comprises a detector duct of generally rectangular cross section housing two ultrasonic detectors one at each end, lying adjacent the detector duct is an intake duct having an inlet air filter which also serves as an ultrasonic acoustic filter. Adjacent ends of the intake and detector ducts are joined by a deflector which turns the air through 180° as it passes from the intake duct to the detector duct. Within the deflector are fins which guide the air and turn it with the minimum of pressure loss and turbulence; adjacent the deflector in the intake duct is located a set of fins serving to diffuse the air as it passes, to reduce any temperature or velocity gradient across its width, and adjacent the deflector in the detector duct is located a set of fins serving to guide the air stream and reduce turbulence maintaining the even pressure and temperature across the stream.

1 Claim, 4 Drawing Figures

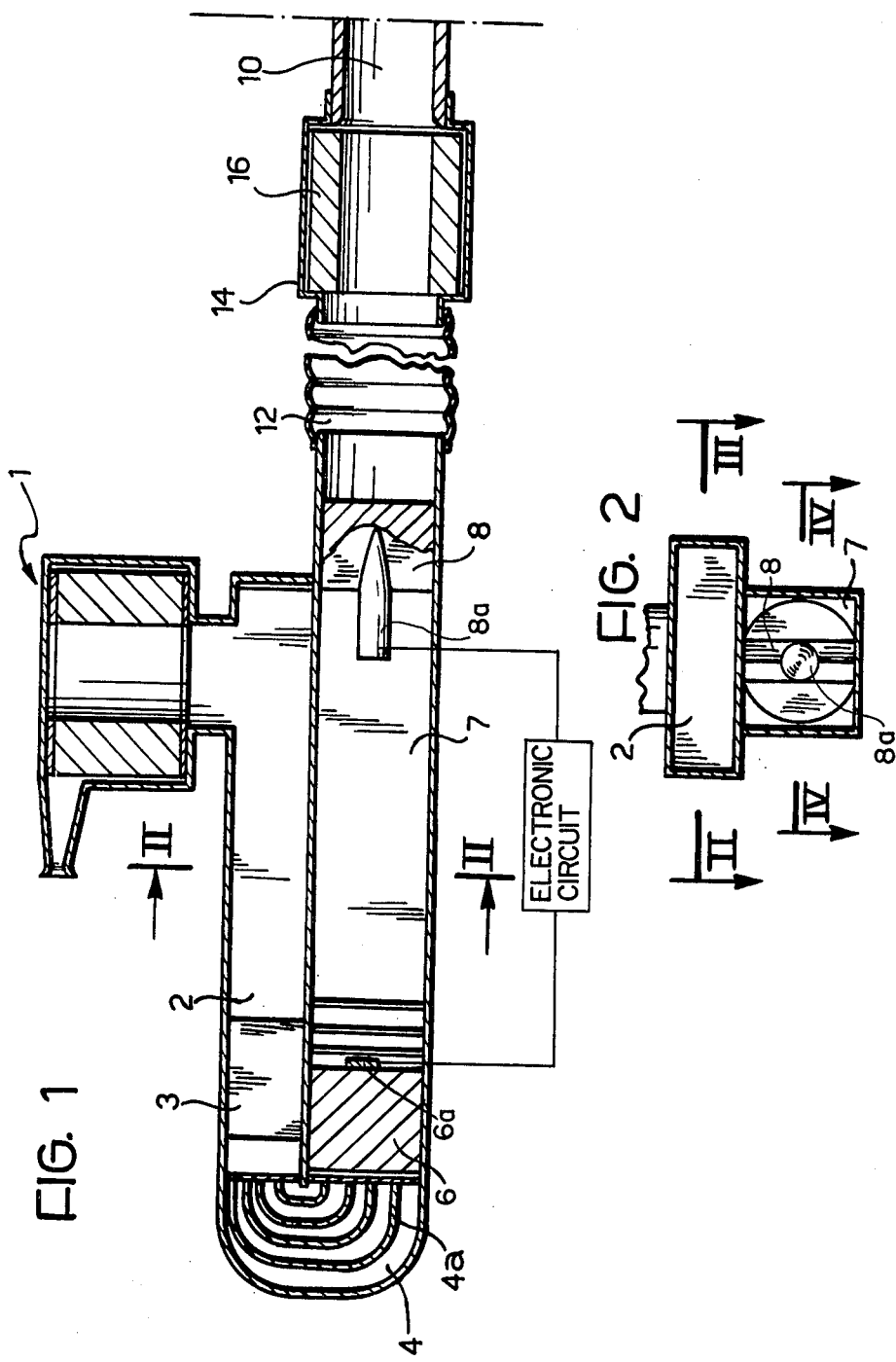

ULTRASONIC DEVICE FOR THE DETERMINATION OF THE RATE OF AIR FLOW IN THE INLET DUCT OF AN INTERNAL COMBUSTION ENGINE

The present invention relates to an ultrasonic device for the determination of the rate of air flow in the inlet duct of an internal combustion engine, which is particularly suitable for fuel injection engines which are controlled by the device itself.

Ultrasonic devices for the determination of the rate of air flow in an inlet duct are known as such: these devices are usually positioned within the inlet duct or pipe of the engine. One known such device has two piezoelectric transducers situated at opposite ends of the device itself, one of the two ends of the device being fitted with an expansion chamber within which there is a conical element covered with insulating material; this construction is described, for example, in Italian Patent Application No. 68095 A/75 filed by the same applicant.

Known devices of this type have, however, the disadvantage of being very sensitive to transverse pressure or temperature gradients, and it is clear that in practically all automobile applications thermal gradients are likely to be unavoidable, whilst the air drawn into the inlet duct flows in a turbulent manner around the piezo-electric transducers causing changing pressure gradients.

The present invention seeks to avoid these disadvantages of known such devices, and to provide a device which can be installed on an internal combustion engine for the determination, by ultrasonic means, of the air flow in the inlet duct, which is so constructed that velocity and temperature gradients in the stream are stabilised before it impinges on the transducers: likewise the flow conditions of the air around the external surface of the transducers is stabilised in such a way as to avoid the formation of turbulent flow and thence to ensure greater precision in the determination than has hitherto been possible.

According to the present invention a device for determining, by ultrasonic means, the rate of air flow in the inlet duct of an internal combustion engine, of the type comprising a detector duct at respective opposite ends of which are situated two piezo-electric transducers of ultrasonic type the outputs from which are connected to an electronic circuit which operates to determine the air flow rate from the transducer output signals, is characterised in that it comprises an intake duct of generally rectangular cross section extending adjacent the said detector duct which is also of generally rectangular cross section, the intake and detector ducts being joined at one end by a U-shape deflector element, a first acoustic filter connected to the said intake duct and serving to absorb the ultrasonic frequency components of noise generated externally of the device, a first set of fins located in the said intake duct shaped so as to render substantially uniform across the width of the air stream both the air speed and the temperature of the air stream flowing therepast, a second set of fins in the said U-shape deflector element for diverting the air flow from the said intake duct into the said detector duct, a third set of fins located in the said detector duct and shaped to align the stream lines of air flowing therepast, a flexible sleeve connected to the said detector duct, means for joining the said flexible sleeve to the inlet duct of the engine, and a second acoustic filter for absorbing the ultrasonic frequencies of noise generated by the engine itself.

One embodiment of the invention will now be more particularly described, by way of example, with reference to the accompanying drawings, in which:

FIG. 1 is a plan view, in longitudinal axial section, of the embodiment of the invention;

FIG. 2 is a cross section taken on the line II—II of FIG. 1;

Figure 3:
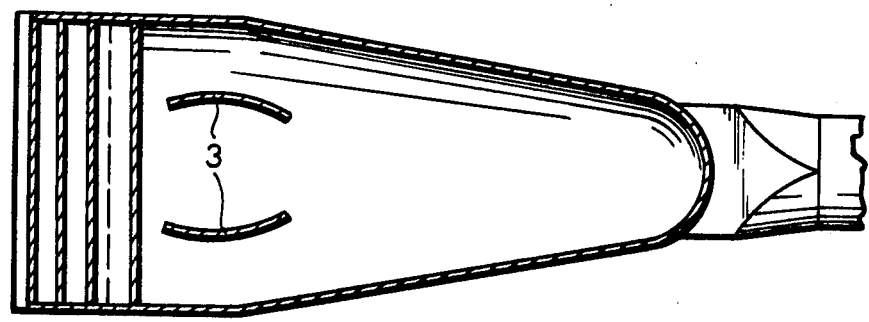
FIG. 3 is a partial axial section taken on the line III—III of FIG. 2.

Referring now to FIGS. 1 to 4 of the drawings there is shown an air filter 1 typical of those used on the inlet ducts of internal combustion engines on motor vehicles. This filter may be, as shown, a normal production air filter, or may alternatively be a specially designed compact filter incorporated into the structure of the device itself. This air filter 1 also acts as an acoustic absorbing filter, for absorbing the ultrasonic frequency components of noises generated externally of the device, but which would otherwise have been picked up by the transducers of the device as working signals, with resulting irregularities of reading.

The filter 1 is connected by an intake duct 2 to a detector duct 7: in the former there are located two fixed fins 3 which are appropriately shaped so that, by the formation of a diffuse turbulence, the air speed across the air stream is rendered more uniform and the temperature likewise. The air stream then passes to an air deflector 4 having a plurality of conveyor fins 4a, which are shaped so as to divert the air flow through 180° with the smallest possible loss of pressure, and avoiding the formation of turbulence and local pressure gradients.

Figure 4:
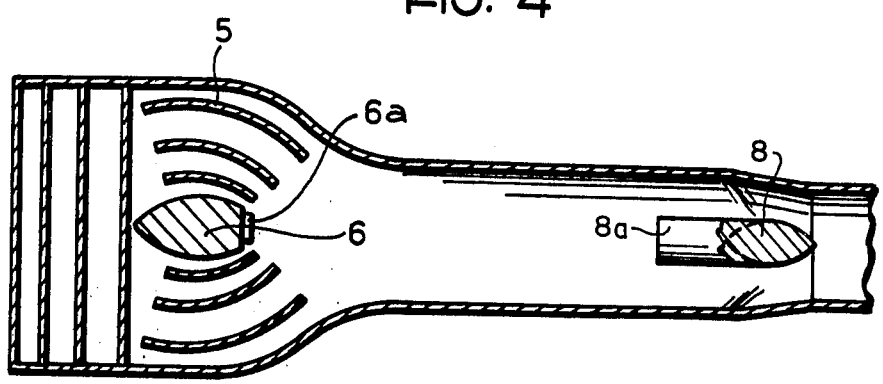
FIG. 4 is a partial axial section taken on the line IV—IV of FIG. 2.

When leaving this deflector 4 the air stream is directed, by means of a series of appropriately shaped fins 5, which can be seen in FIG. 4, along the detector duct 7. The fins 5 are shaped to ensure the dispersal of local vortices and to enable good alignment of the fluid stream lines in the critical zone, around which the fins 5 are grouped, and in which is located a piezo-electric transducer 6a mounted on an appropriately shaped support 6, which can be seen in FIG. 4. Downstream from the transducer 6a, within the detector duct 7 are located a second support 8 and a second piezo-electric transducer 8a.

After passing the transducer 8a the air flow enters a flexible sleeve 12 which connects the air flow measuring device to the inlet duct 10 of the engine. At this junction there is located a union 14 which incorporates an acoustic filter 16 for absorbing the ultrasonic frequency components of noises generated within the engine and which might otherwise be transmitted upstream to one or both of the transducers leading to inaccurate determination of the air flow rate.

I Claim:

1. A device for determining, by ultrasonic means, the rate of air flow in the inlet duct of an internal combustion engine, comprising:

a detector duct of generally rectangular cross section, two piezo-electric transducers of ultrasonic type situated at respective opposite ends of said detector duct, an electronic circuit connected to the outputs from said ultrasonic piezo-electric transducers, said electronic circuit operating to determine the air flow rate from the output signals from said ultrasonic piezo-electric transducers, an intake duct of generally rectangular cross section extending adjacent said detector duct, a U-shape deflector joining one end of said intake and detector ducts together, a first acoustic filter connected to said intake duct and serving to absorb the ultrasonic frequency components of noise generated externally of said device, a first set of fins located in said intake duct and shaped so as to render substantially uniform, across the air stream in said intake duct, both the air speed and the temperature of the air stream flowing therepast, a second set of fins located in said U-shape deflector for diverting the air flow from said intake duct into said detector duct, a third set of fins located in said detector duct for aligning the stream lines of fluid flowing therepast, a flexible sleeve connected to said detector duct, means for joining said flexible sleeve to the inlet duct of the engine, and a second acoustic filter for absorbing the ultrasonic frequencies of noise generated by the engine itself.

* * * * *